United States Patent
Kurematsu (10) Patent No.: US 10,221,924 B2
(45) Date of Patent: Mar. 5, 2019

(54) CHAIN TENSIONER

(71) Applicant: TSUBAKIMOTO CHAIN CO., Osaka-shi, Osaka (JP)

(72) Inventor: Yuji Kurematsu, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 185 days.

(21) Appl. No.: 15/351,769

(22) Filed: Nov. 15, 2016

(65) Prior Publication Data

US 2017/0138444 A1 May 18, 2017

(30) Foreign Application Priority Data

Nov. 16, 2015 (JP) ................................. 2015-224046

(51) Int. Cl.
*F16H 7/08* (2006.01)
(52) U.S. Cl.
CPC ...... *F16H 7/0848* (2013.01); *F16H 2007/0806* (2013.01); *F16H 2007/0814* (2013.01); *F16H 2007/0859* (2013.01); *F16H 2007/0872* (2013.01); *F16H 2007/0893* (2013.01)
(58) Field of Classification Search
CPC ........................... F16H 7/08; F16H 2007/0814
USPC ................................................. 474/110, 111
See application file for complete search history.

(56) References Cited

U.S. PATENT DOCUMENTS

| | | | | |
|---|---|---|---|---|
| 5,720,684 A * | 2/1998 | Mott | ...................... | F16H 7/0848 474/101 |
| 5,967,921 A * | 10/1999 | Simpson | ................... | F16H 7/08 474/110 |
| 6,383,103 B1 * | 5/2002 | Fujimoto | ................... | F01L 1/02 474/109 |
| 7,927,242 B2 * | 4/2011 | Namie | ................... | F16H 7/0848 474/101 |
| 2006/0063625 A1 * | 3/2006 | Emizu | ................... | F16H 7/0836 474/110 |
| 2008/0064546 A1 * | 3/2008 | Ullein | ................... | F16H 7/0848 474/110 |
| 2009/0197722 A1 * | 8/2009 | Emizu | ................... | F16H 7/0836 474/110 |
| 2014/0187367 A1 * | 7/2014 | Todd | ................... | F16H 7/08 474/110 |

(Continued)

FOREIGN PATENT DOCUMENTS

JP 2000-240744 A 9/2000

*Primary Examiner* — William E Dondero
*Assistant Examiner* — Mark K Buse
(74) *Attorney, Agent, or Firm* — Westerman, Hattori, Daniels & Adrian, LLP (57) ABSTRACT

To provide a chain tensioner capable of constantly applying an appropriate pressing force under any situations including high-speed, high-load operation, at the start of an engine, and normal range operation, without an increase in size or amount of oil consumption. A check valve unit 150 is disposed between an oil pressure chamber 101 and an oil supply part 103. A second oil pressure chamber 102 is formed between an outer circumferential surface of a plunger 120 and a cylindrical surface 113 of a plunger bore 111, into which oil leaking from the oil pressure chamber 101 flows and whose volume increases as the plunger 120 retracts. Further provided is a relief valve unit 130 that releases oil when the pressure of the second oil pressure chamber 102 reaches or exceeds a predetermined high level.

5 Claims, 6 Drawing Sheets

(56) References Cited

U.S. PATENT DOCUMENTS

2017/0130807 A1\* 5/2017 Kurematsu ............ F16H 7/0848
2018/0112748 A1\* 4/2018 Todd .................... F16H 7/0848

\* cited by examiner

CHAIN TENSIONER

BACKGROUND OF THE INVENTION

1. Field of the Invention

The present invention relates to a chain tensioner that includes a tensioner body having a cylindrical plunger bore with one open end, a cylindrical plunger slidably inserted in the plunger bore, and biasing means accommodated inside an oil pressure chamber formed between the plunger bore and the plunger such as to freely expand and contract and to urge the plunger in an advancing direction, and that maintains appropriate tension of a chain.

2. Description of the Related Art

It has been common practice to use a chain tensioner for maintaining appropriate tension of a chain. For example, a chain guide mechanism has been known, which slidably guides, by means of a guide shoe, a transmission chain such as an endless roller chain passing over respective sprockets of a crankshaft and a cam shaft inside an engine room, and which uses a chain tensioner to press a pivoting chain guide having the guide shoe to maintain appropriate tension.

Figure 5:
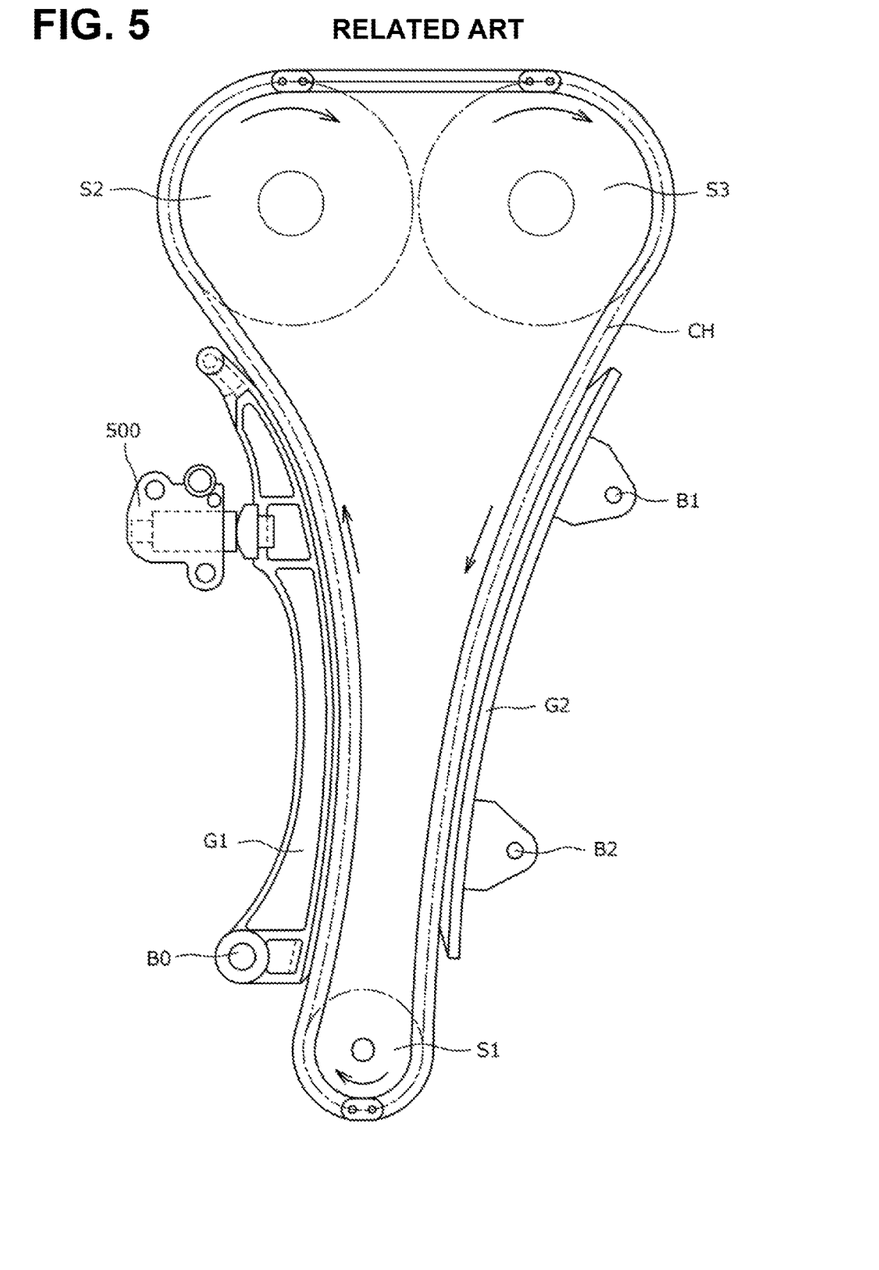
FIG. 5 is an illustrative diagram of the chain tensioner used in a chain guide mechanism of an engine.

A chain guide mechanism is configured as shown in FIG. 5, for example, wherein a pivoting chain guide G1 and a fixed chain guide G2 guide an endless timing chain CH passing over a drive sprocket S1 of a crankshaft and a pair of driven sprockets S2 and S3 of cam shafts inside an engine room.

The fixed chain guide G2 is fixed in position in the engine room, with two mounting shafts B1 and B2, while the pivoting chain guide G1 is attached such as to be pivotable around the mounting shaft B0 in the plane in which the timing chain CH runs in the engine room.

A chain tensioner 500 presses the pivoting chain guide G1 and thereby maintains the tension of the timing chain CH at an appropriate level as well as reduces its vibration.

Figure 6:
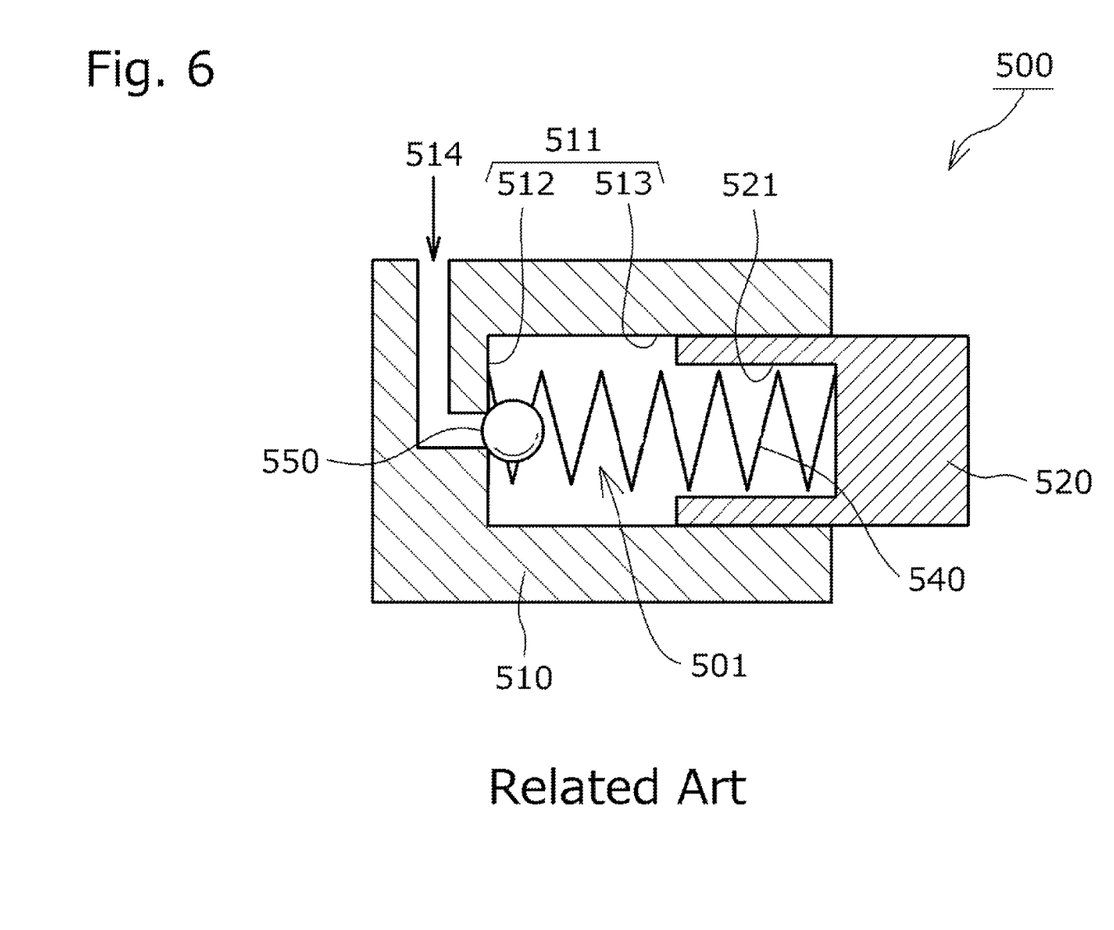
FIG. 6 is a schematic illustrative diagram of a conventional chain tensioner.

The known chain tensioner 500 used in such a chain guide mechanism includes, for example, as shown schematically in FIG. 6, a tensioner body 510 having a cylindrical plunger bore 511 with one open end, a cylindrical plunger 520 inserted in the plunger bore 511 to freely slide against a cylindrical surface 513 of the plunger bore 511, and means for biasing the plunger 520 in an advancing direction from the plunger bore 511.

The biasing means is formed by a coil spring 540 accommodated inside a cylindrical recess 521 in the cylindrical plunger 520 and compressed between the plunger and a bottom part 512 of the plunger bore 511.

Oil is supplied from an oil supply hole 514 formed in the plunger bore 511, so that an oil pressure chamber 501 formed between the plunger bore 511 and the plunger 520 is filled with the oil, which oil urges the plunger 520 in the advancing direction. A check valve 550 (schematically shown as a check ball) stops the oil from flowing out from the oil supply hole 514.

As the plunger 520 thereby reciprocates, the oil flows through a small gap between the plunger 520 and the plunger bore 511, and the flow resistance provides the damping effect of slowing down the reciprocal movement of the plunger 520.

SUMMARY OF THE INVENTION

In such a chain tensioner, because of the worry that rattling may occur due to looseness in the chain during high-speed, high-load operation, or at the start of the engine when the hydraulic damping force does not effectively act due to entrapped air or the like, it is desirable that the biasing means be designed to have a large spring load, or the plunger be made with a large diameter. However, the biasing means with a large spring load would press the chain more than necessary during normal range operation, and the increased chain tension would deteriorate friction properties between the chain and its running surface, and would further lead to an increased noise and poorer engine fuel economy.

On the other hand, increasing the plunger diameter would require a larger design for the chain tensioner itself, and bring up problems such as larger installation space being required, and increased weight and cost.

In one known chain tensioner, to mitigate these problems, an orifice is provided for releasing oil in the oil pressure chamber (high pressure oil chamber 8) to the outside with a predetermined flow resistance so as to eject the air that has been entrapped earlier after the start of the engine, so that rattling or looseness of the chain is reduced (see, Japanese Patent Application Laid-open No. 2000-240744, etc).

However, with the technique described in Japanese Patent Application Laid-open No. 2000-240744, the hydraulic damping effect does not act immediately after the start of the engine, and when the biasing means has a small spring load, the preventive effects were limited.

Moreover, because the oil is released to the outside from the orifice and more oil is consumed, the oil pump performance needed to be enhanced.

Furthermore, this technique was not particularly effective for the rattling or looseness of the chain during high-speed, high-load operation.

It is an object of the present invention to solve these problems and to provide a chain tensioner capable of constantly applying an appropriate pressing force under any situations including high-speed, high-load operation, at the start of the engine, and normal range operation, without an increase in size or amount of oil consumption.

The chain tensioner of the present invention includes: a tensioner body having a cylindrical plunger bore with one open end; a cylindrical plunger slidably inserted in the plunger bore; biasing means accommodated inside an oil pressure chamber formed between the plunger bore and the plunger such as to freely expand and contract and to urge the plunger in an advancing direction; a check valve unit disposed between the oil pressure chamber and an oil supply part; a second oil pressure chamber formed between an outer circumferential surface of the plunger and a cylindrical surface of the plunger bore, into which oil leaking from the oil pressure chamber flows and whose volume increases as the plunger retracts; and a relief valve unit that releases oil when pressure of the second oil pressure chamber reaches or exceeds a predetermined high level. The problems described above are thereby solved.

The chain tensioner according to claim 1 includes a second oil pressure chamber formed between an outer circumferential surface of the plunger and a cylindrical surface of the plunger bore, into which oil leaking from the oil pressure chamber flows and whose volume increases as the plunger retracts, and a relief valve unit that releases oil when pressure of the second oil pressure chamber reaches or exceeds a predetermined high level. In or below the normal operation range, the pressure of the second oil pressure chamber does not exceed the valve opening pressure of the relief valve unit. When the plunger advances, a flow of oil from the second oil pressure chamber back into the oil pressure chamber is created. Thus a hydraulic damping force acts when the plunger advances, which force acts to reduce the pressing force of the biasing means on the plunger in the advancing direction.

Therefore, even when the spring load of the biasing means is set high, in the normal operation range, the plunger is prevented from being advanced with an unnecessarily large force to push the chain with too much force and to increase the chain tension. Accordingly, the friction properties between the chain and its running surface are improved, and a noise increase or degradation of engine fuel economy are prevented.

At the start of the engine, the second oil pressure chamber and oil pressure chamber are not filled with oil and there is hardly any damping force acting between the second oil pressure chamber and the oil pressure chamber. Since there is no force acting to reduce the pressing force of the biasing means on the plunger in the advancing direction, rattling or looseness of the chain can be prevented with the biasing means designed to have a large spring load.

During high-speed, high-load operation, the pressure of the second oil pressure chamber is also high, which causes the relief valve unit to open. Therefore, no flow of oil from the second oil pressure chamber back into the oil pressure chamber is created, and no hydraulic damping force acts when the plunger advances. Since there is no force acting to reduce the pressing force of the biasing means on the plunger in the advancing direction, the biasing means designed to have a large spring load can apply a sufficient pressing force.

As can be seen, this allows the biasing means to have a large spring load, so that the plunger diameter need not be increased. Therefore, the tensioner can be made smaller, and offers a higher degree of freedom in installation space, and also allows the weight and cost to be reduced.

According to the configuration set forth in claim 2, an orifice that regulates the amount of oil is provided between the oil pressure chamber and the second oil pressure chamber. By suitably designing the orifice, the flow resistance of the oil flowing between the second oil pressure chamber and the oil pressure chamber can be set to provide an appropriate damping force, which in turn enables a pressing force of the biasing means on the plunger in the advancing direction to be correctly set.

According to the configuration set forth in claim 3, the relief valve unit is disposed such as to allow the oil to circulate back to the oil supply part. Since no oil is released to the outside and oil consumption is reduced, the oil pump performance need not be enhanced.

According to the configuration set forth in claim 4, a second relief valve unit is further provided, which allows the oil to circulate back to the oil supply part when the pressure of the oil pressure chamber reaches or exceeds a predetermined high level, and the second relief valve unit has a higher valve opening pressure than that of the relief valve unit. This feature enables even higher speed and higher load applications to be covered, for which an excessive load needs to be avoided because the chain tension becomes very high. Thus the applicable operation range can be further extended.

According to the configuration set forth in claim 5, the check valve unit is disposed as a valve element of the second relief valve unit, and the second relief valve unit and the check valve unit are formed integral with each other. Therefore, even though the relief unit and the check valve unit are assembled inside, they do not cause the tensioner to become bulky.

DESCRIPTION OF THE PREFERRED EMBODIMENTS

Embodiment 1

A chain tensioner 100 according to a first embodiment of the present invention will be described with reference to the drawings.

Figure 1:
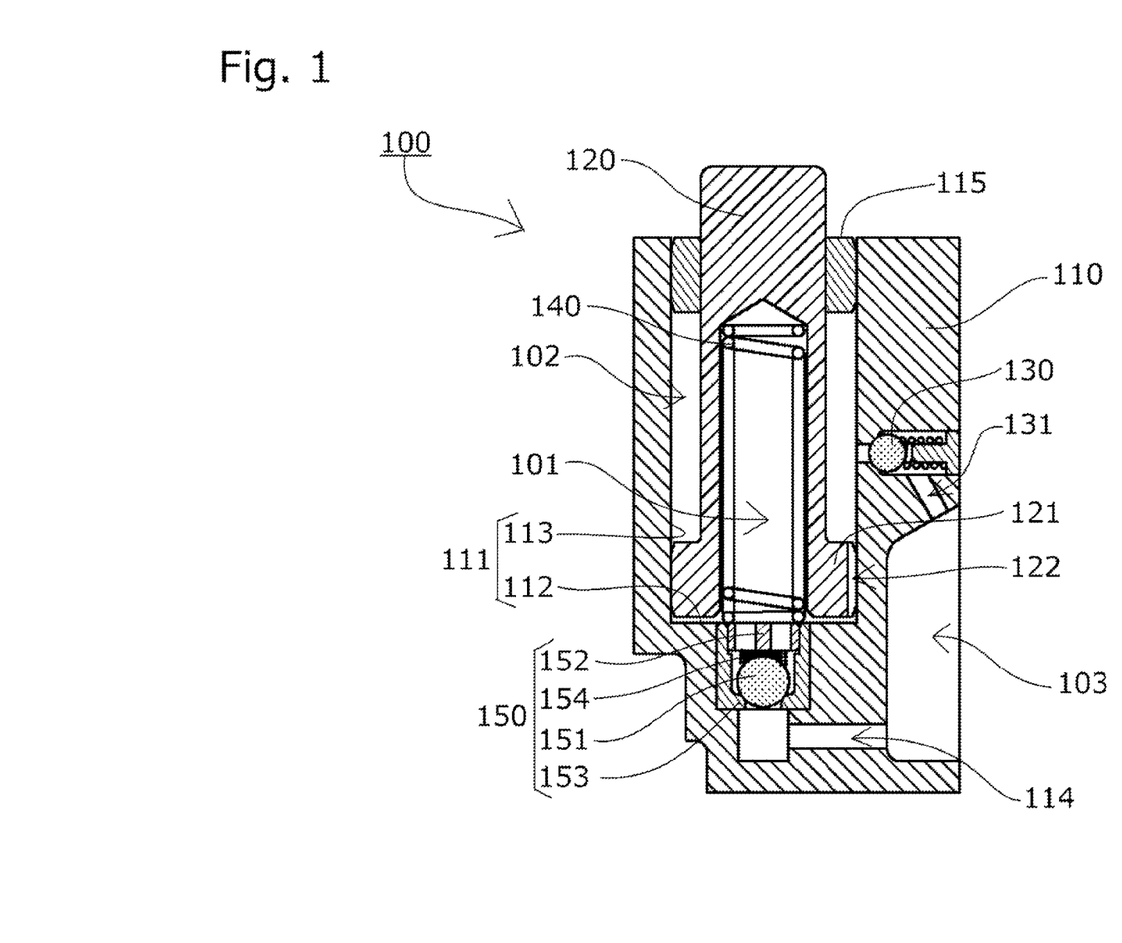
FIG. 1 is a cross-sectional view of a chain tensioner according to a first embodiment of the present invention.

The chain tensioner 100 includes, as shown in FIG. 1, a tensioner body 110 having a cylindrical plunger bore 111 with one open end, a cylindrical plunger 120 slidably inserted in the plunger bore 111, and a coil spring 140 that is biasing means accommodated inside an oil pressure chamber 101 formed between the plunger bore 111 and the plunger 120 such as to be able to expand and contract and to urge the plunger 120 in an advancing direction.

An oil supply part 103, to which oil is supplied from the engine or the like, is formed in the surface of the tensioner body 110 that is attached to the engine or the like.

In a bottom part 112 of the plunger bore 111 is provided a check valve unit 150, so that the oil supplied to the oil supply part 103 is delivered through an oil supply hole 114 via the check valve unit 150 into the oil pressure chamber 101.

The check valve unit 150 includes a check ball 151, a check valve seat 153 that opens and closes as the check ball 151 sits thereon and separates therefrom, a retainer 152 holding the check ball 151 inside the check valve seat 153, and a ball pressing spring 154 that lightly presses the check ball 151 toward the check valve seat 153.

The plunger 120 has a large-diameter part 121 on one side thereof closer to the bottom part 112 of the plunger bore 111 such as to be in sliding contact with a cylindrical surface 113 of the plunger bore 111. A distal end sealing 115 is provided on the distal end side of the plunger bore 111 such as to be in contact with part of the plunger 120 other than the large-diameter part 121.

Therefore, between an outer circumferential surface of the plunger 120 and the cylindrical surface 113 of the plunger bore 111 is formed a second oil pressure chamber 102, which is defined by the large-diameter part 121 of the plunger 120 moving back and forth, and the distal end sealing 115, and whose volume increases with a backward movement of the plunger 120.

Oil leaks through a gap between the large-diameter part 121 and the cylindrical surface 113 and flows between the oil pressure chamber 101 and the second oil pressure chamber 102. An orifice 122 is provided in the large-diameter part 121 for regulating the amount of this leaking oil.

The tensioner body 110 includes a relief valve unit 130 that releases oil to the oil supply part 103 when the pressure of the second oil pressure chamber 102 reaches or exceeds a predetermined high level.

While this embodiment employs the relief valve unit 130 that has a ball valve, the valve unit may be of any type.

How the chain tensioner 100 according to the first embodiment of the present invention configured as described above operates will be explained.

Oil is supplied from the oil supply hole 114 via the check valve unit 150 into the oil pressure chamber 101, and the oil in the oil pressure chamber 101 is delivered to the second oil pressure chamber 102 via the orifice 122.

At the start of the engine after a long stop, the oil pressure chamber 101 and second oil pressure chamber 102 are not filled with oil, so that no damping force acts, as no oil passes through the orifice 122.

The spring load of the coil spring 140 directly acts as the pressing force for the plunger 120 to advance, and therefore by designing the coil spring 140 to have a sufficiently large spring load, rattling or looseness of the chain can be prevented.

After the start of the engine, when the engine rpm reaches a normal range, the oil pressure chamber 101 and second oil pressure chamber 102 are filled with oil.

During the engine operation, the plunger 120 stays substantially at the same position, while being biased toward the advancing direction by the spring load of the coil spring 140 and the hydraulic pressure from the oil pressure chamber 101, and reciprocated in accordance with the tension fluctuations of the chain.

Once the plunger 120 is pushed in, and moves in the advancing direction after that, a flow of oil from the second oil pressure chamber 102 back into the oil pressure chamber 101 is generated because of the reduction in volume of the second oil pressure chamber 102, whereby a damping force acts as a force in a direction in which the pressing force of the coil spring 140 on the plunger in the advancing direction is reduced.

Therefore, even though the spring load of the coil spring 140 is set high so as to prevent rattling or looseness of the chain at the start of the engine, the plunger is prevented from advancing with an unnecessarily large force to push the chain with too much force and to increase the chain tension. Accordingly, the friction properties between the chain and its running surface are improved, and a noise increase or degradation of engine fuel economy are prevented.

When the engine rpm further increases to a high speed range, the load increases, too, and so does the chain tension. The pressure levels of the oil pressure chamber 101 and of the second oil pressure chamber 102 rise, too, which causes the relief valve unit 130 to open.

Therefore, when the plunger 120 is pushed in and then advances, the oil is released from the second oil pressure chamber 102 via the relief valve unit 130, so that no oil flows back to the oil pressure chamber 101, i.e., the hydraulic damping force is no longer generated when the plunger 120 advances.

Consequently, no force acts in a direction in which the pressing force of the biasing means on the plunger 120 in the advancing direction is reduced, and the spring load of the coil spring 140 directly acts as a pressing force for the plunger 120 to advance, which means that the coil spring 140 designed to have a large spring load can apply a sufficiently high pressing force to counterbalance the high chain tension.

The relief valve unit 130 is disposed such as to allow the oil to circulate back to the oil supply part 103, so that no oil is released to the outside. Oil consumption is thus reduced, which obviates the need for enhancing the oil pump performance.

Embodiment 2

Figure 2:
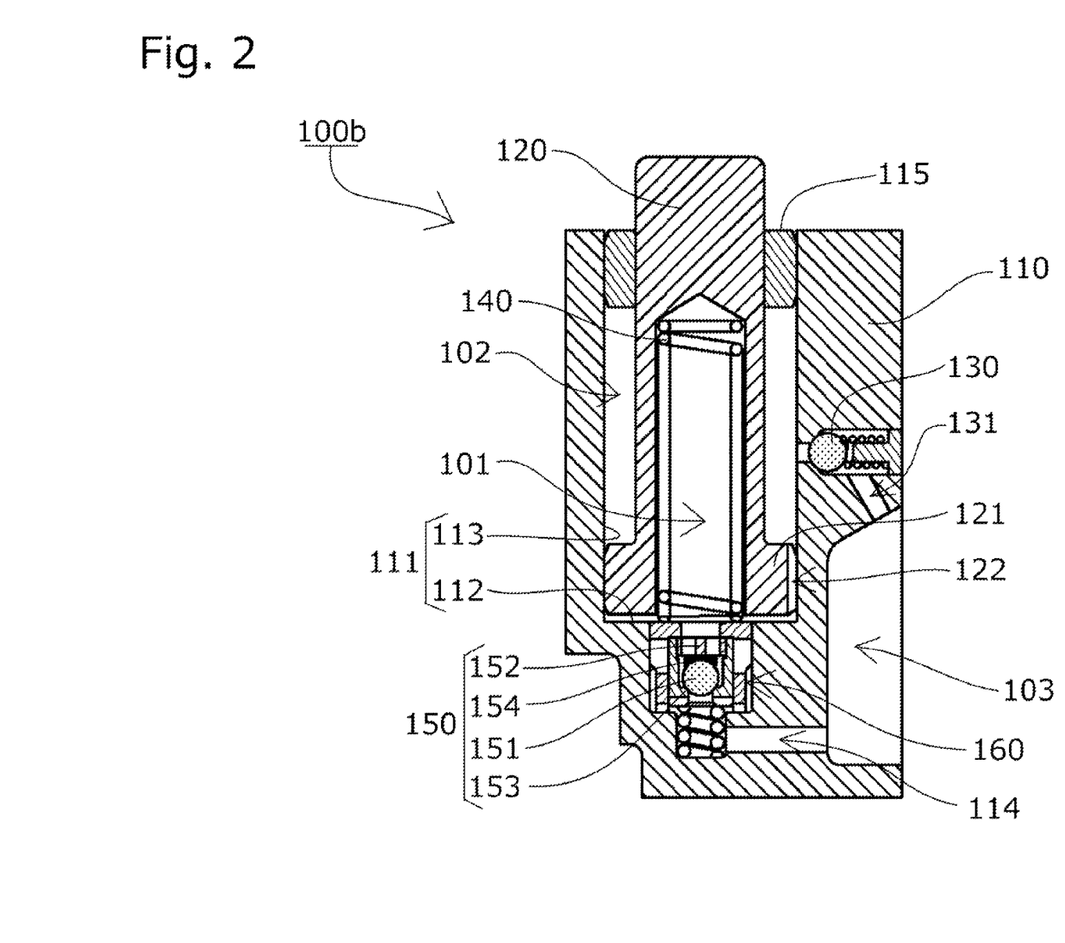
FIG. 2 is a cross-sectional view of a chain tensioner according to a second embodiment of the present invention.

The chain tensioner 100b according to the second embodiment of the present invention includes, as shown in FIG. 2, a second relief valve unit 160 that allows the oil to circulate back to the oil supply part 103 when the pressure of the oil pressure chamber 101 reaches or exceeds a predetermined high level. The check valve unit 150 is disposed as a valve element of the second relief valve unit 160, and the second relief valve unit 160 and the check valve unit 150 are formed integral with each other.

Figures 3A, 3B:
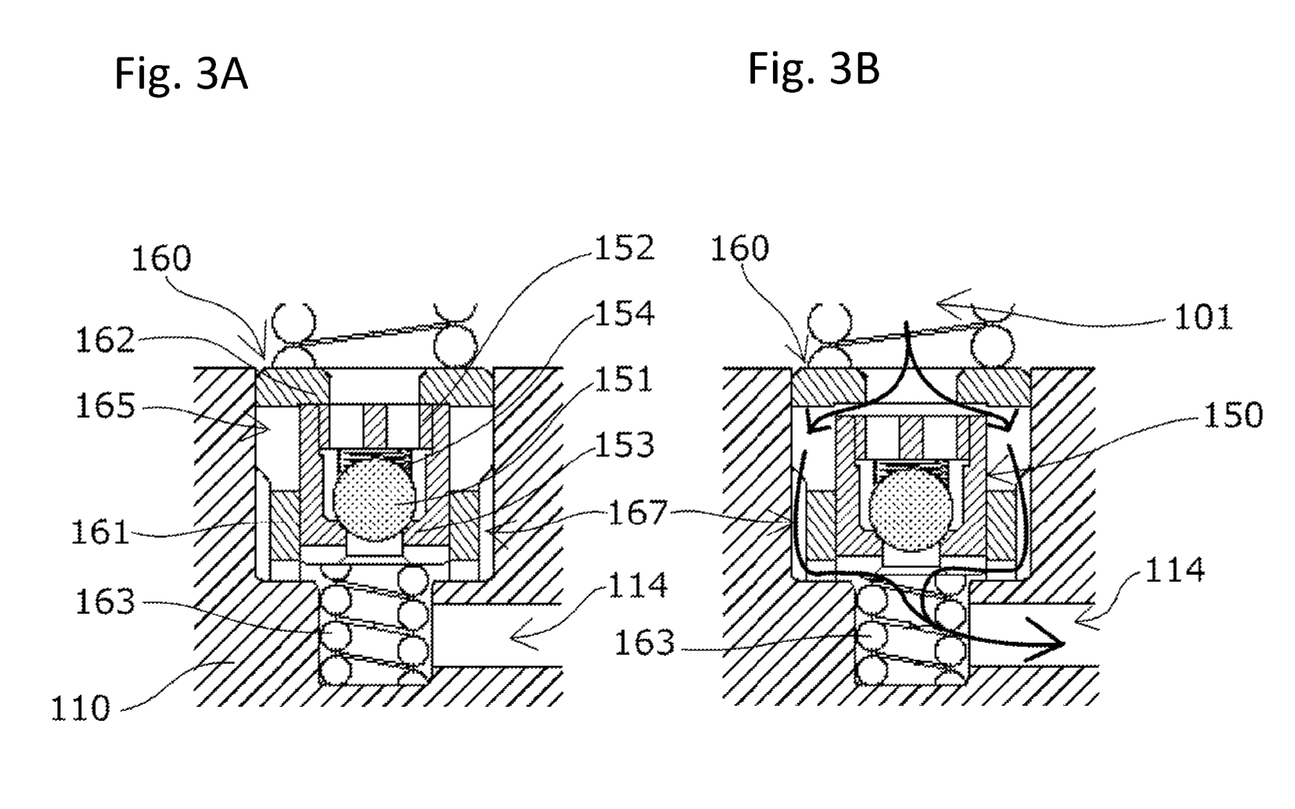
FIG. 3A and FIG. 3B are enlarged cross-sectional views of a second relief valve unit of FIG. 2.

The second relief valve unit 160 includes, as shown in FIG. 3A, a relief sleeve 161 that slidably holds the check valve unit 150 inside, a relief valve seat 162 that opens and closes as the check valve unit 150 slides, and a unit pressing spring 163 for pressing the check valve unit 150 toward the relief valve seat 162. One end of the unit pressing spring 163 is seated inside the tensioner body 110.

Optionally, a spring retainer that supports and fixes the unit pressing spring 163 may be fixedly attached to the relief sleeve 161.

The relief sleeve 161 includes, on the rear side of the relief valve seat 162, a relief hole 165 that is a relief part for letting out the oil that is released when the pressure reaches or exceeds a predetermined high level to the outer circumferential side. An orifice 167 is formed on one side of the relief hole 165 closer to the oil supply hole 114.

The check valve unit 150 includes a check ball 151, a check valve seat 153 that opens and closes as the check ball 151 sits thereon and separates therefrom, a retainer 152 holding the check ball 151 inside the check valve seat 153, and a ball pressing spring 154 that lightly presses the check ball 151 toward the check valve seat 153.

The check valve seat 153 has a cylindrical outer shape and is configured to sit on the relief valve seat 162 of the second relief valve unit 160.

The valve opening pressure of the second relief valve unit 160 is set higher than the valve opening pressure of the relief valve unit 130.

Other features are similar to those of the first embodiment and will not be described.

How the chain tensioner 100b according to the second embodiment of the present invention configured as described above operates will be explained.

The operation at the start of the engine after a long stop, and the operation in the normal range and until the rpm reaches the high speed range are the same as those of the first embodiment.

In this embodiment, when the rpm reaches an even higher speed range, and the pressure of the oil pressure chamber 101 further rises, the second relief valve unit 160 designed to have a higher valve opening pressure than that of the relief valve unit 130 opens, so as to reduce the hydraulic pressing force, as well as to lower the damping force when the plunger 120 is retracted. This way, the plunger can better follow a peak tension, and even higher speed and higher load applications can be covered, for which an excessive load needs to be avoided because the chain tension becomes very high.

The second relief valve unit 160 is disposed such as to allow the oil to circulate back to the oil supply part 103, so that no oil is released to the outside. Oil consumption is thus reduced, which obviates the need for enhancing the oil pump performance.

Figure 4:
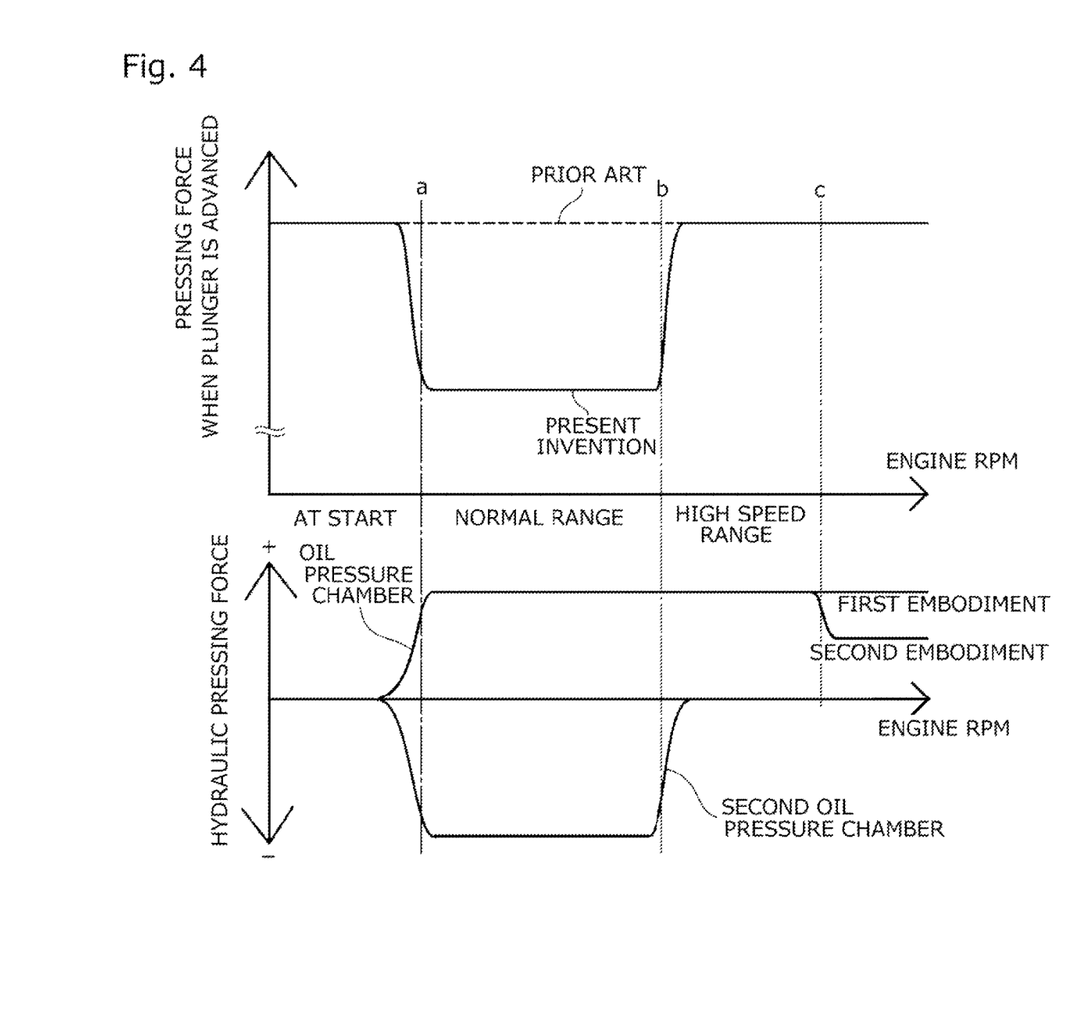
FIG. 4 is a diagram for explaining the characteristics of the pressing force exerted by the chain tensioner according to the present invention.

The characteristics of the pressing force exerted by the chain tensioner according to the present invention are shown in FIG. 4.

With the prior art chain tensioner, the pressing force of the advancing plunger was substantially constant, irrespective of the rpm, corresponding to the spring load of the coil spring that is the biasing means.

With the chain tensioner according to the present invention, at the start (with an rpm at or below point a), the oil pressure chamber 101 and second oil pressure chamber 102 are not filled with oil and there is no hydraulic pressure, so that the spring load of the coil spring as the biasing means directly acts as the pressing force.

In the normal range (rpm from point a to b), the oil pressure chamber 101 and second oil pressure chamber 102 are filled with oil and, as described above, the presence of the second oil pressure chamber 102 generates a force that acts to reduce the pressing force on the plunger in the advancing direction, and therefore the pressing force is maintained small.

In the high speed range (rpm at or above point b), as described above, the relief valve unit 130 opens to negate the effect of the second oil pressure chamber 102 so that, as with the prior art chain tensioner, the spring load of the coil spring as the biasing means again directly acts as the pressing force.

Moreover, in the second embodiment, in an even higher speed range (rpm at or above point c), the second relief valve unit 160 opens, so as to reduce the hydraulic pressing force.

The pressing force provided by the oil in the oil pressure chamber 101 increases with an increase in rotation speed, but since the increase is not a great ratio relative to the spring load of the coil spring that is the biasing means, the pressing force is simply illustrated as constant in the drawing.

The graphs in FIG. 4 show exaggerated profiles so that, changes are more easily seen and do not indicate actual values.

While a specific example of the chain tensioner according to the present invention has been described in the embodiments above, the chain tensioner according to the present invention is not limited to these examples, and the shapes, positions, sizes, and positional relationships with each other of various constituent parts may be changed in various manners.

The chain tensioner of the present invention may not necessarily be applied to a chain guide mechanism that uses a guide shoe for slidably guiding a transmission chain such as an endless roller chain passing over respective sprockets of a crankshaft and a cam shaft in an engine room, but may also be adopted in applications where the chain is slidably guided directly by the distal end of the plunger.

The chain tensioner may not necessarily be applied to a chain transmission mechanism but also used for similar transmission mechanisms that use belts, ropes and the like, and can be applied in a variety of industrial fields.

What is claimed is:

1. A chain tensioner comprising: a tensioner body having a cylindrical plunger bore with one open end; a cylindrical plunger slidably inserted in the plunger bore; biasing means accommodated inside an oil pressure chamber formed between the plunger bore and the plunger such as to freely expand and contract and to urge the plunger in an advancing direction;
    a check valve unit disposed between the oil pressure chamber and an oil supply part;
    a second oil pressure chamber formed between an outer circumferential surface of the plunger and a cylindrical surface of the plunger bore, into which oil leaking from the oil pressure chamber flows and of which volume increases as the plunger retracts; and
    a relief valve unit that releases oil when pressure of the second oil pressure chamber reaches or exceeds a predetermined high level.

2. The chain tensioner according to claim 1, further comprising an orifice that regulates an amount of leaking oil between the oil pressure chamber and the second oil pressure chamber.

3. The chain tensioner according to claim 1, wherein the relief valve unit is disposed such as to allow the oil to circulate back to the oil supply part.

4. The chain tensioner according to claim 1, further comprising a second relief valve unit that allows the oil to circulate back to the oil supply part when the pressure of the oil pressure chamber reaches or exceeds a predetermined high level, wherein
    the second relief valve unit has a valve opening pressure that is higher than a valve opening pressure of the relief valve unit.

5. The chain tensioner according to claim 4, wherein the check valve unit is disposed as a valve element of the second relief valve unit,
    the second relief valve unit and the check valve unit being formed integral with each other.

* * * * *